UNITED STATES PATENT OFFICE.

RUDOLF WEISSGERBER AND KONRAD KELLER, OF DUISBURG-MEIDERICH, GERMANY, ASSIGNORS TO GESELLSCHAFT FUR TEERVERWERTUNG M. B. H., OF DUISBURG-MEIDERICH, GERMANY.

PROCESS FOR THE MANUFACTURE OF A SUBSTANCE RESEMBLING NATURAL RUBBER.

1,099,107.  Specification of Letters Patent.  Patented June 2, 1914.

No Drawing.  Application filed August 8, 1912.  Serial No. 714,109.

*To all whom it may concern:*

Be it known that we, RUDOLF WEISSGERBER, a subject of the German Emperor, residing at No. 5 Varzinerstrasse, Duisburg-Meiderich, Germany, and KONRAD KELLER, a subject of the German Emperor, residing at No. 23 Quadtstrasse, Duisburg-Meiderich, Germany, have invented certain new and useful Improvements in the Process for the Manufacture of a Substance Resembling Natural Rubber, of which the following is a specification.

The processes hitherto known for the production of synthetic rubber or substances resembling natural rubber have all consisted in the polymerization by suitable means of 1.3-butadiene or isoprene or other hydrocarbon derivative of butadiene as such. In some cases it has been proposed to carry out those processes by mixing the materials with volatile hydrocarbons, for instance, benzol, but in such cases chemically neutral non-polymerizable diluents have always been employed, and as a matter of fact it is clear from the latest literature (*Ann. d. Chem.* 383.(1911) pages 164, 182, 207) that special importance is placed upon the purity of the raw materials in the manufacture of artificial rubber.

The present inventors have now discovered that contrary to expectation a mixture of non-saturated hydrocarbons, such as can be obtained under various conditions from the distillation products of coal, can be converted for its greater part by the action of sodium into a rubber-like substance, while the other hydrocarbons either do not undergo any change or also form easily separable metallic compounds with sodium. Such mixtures can be separated by fractional distillation from the crude benzol (that is the first runnings of benzol) obtained in the distillation of coal tar or directly in the manufacture of coke. Such a material may be produced by compressing the gaseous products and vapors obtained by the distillation of coal or the like or by refrigerating such products or by both compressing and refrigerating such products. Both products are supposed to contain 1.3-butadiene, according to statements in the literature of the art, (see for instance Meyer-Jakobsohn, *Lehrbuch der Organ. Chem.* Vol. I, 1907, Part I, page 884). In addition to butadiene to which the formation of rubber is probably due, that product contains hydrocarbons with triple linking, as well as cyclopentadiene which has been recognized as being a cyclic non-saturated hydrocarbon by Kraemer and Spilker (*Ber. d. Deutsch. Chem. Ges.* 29, 552, 1896); and it contains also hydrocarbons of non-saturated character and unknown constitution. Of these hydrocarbons accompanying butadiene it was not known hitherto how they would behave toward sodium under the conditions of the present invention. More particularly there was no reason for supposing that in the complicated mixture of these non-saturated hydrocarbons (of which, for instance cyclopentadiene shows the conjugated double linkings requisite for the formation of rubber), butadiene would be the only substance which would undergo conversion into a substance resembling rubber, without the formation of the latter being interfered with by the behavior of the concomitant substances.

Example: The first runnings of crude benzol which have previously been freed from carbon disulfid by known methods, are subjected to fractional distillation which is continued with the employment of a condenser temperature of at least —10 degrees centigrade, until the vapors that pass over show a temperature of 25 degrees C. Then 100 parts of the distillate are mixed with 2 parts of sodium preferably used in the form of wire or strip, and left to itself at the temperature of the atmosphere. After a short time the sodium compounds of the acetylene hydrocarbons separate out in the form of a white to yellowish brown powder which readily settles, whereupon the polymerization of the remaining hydrocarbons begins, and finally the contents of the vessel are converted into a jelly-like mass. When no further thickening of this mass takes place, the whole is diluted with benzol, the sodium compounds are removed by decantation or filtration, and the rubber is precipitated from the benzol solution by means of alcohol. The presence of small quantities of ammonia accelerates the polymerization.

Having now described our invention what we claim as new and desire to secure by Letters Patent is:—

1. A process for the manufacture of a substance resembling natural rubber, which consists in subjecting a fraction of the first runnings of a hydrocarbon of the benzol type taken up to 25 degrees centigrade, free from carbon disulfid, to the action of sodium.

2. A process for the manufacture of a substance resembling natural rubber, which consists in subjecting a fraction of the first runnings of benzol taken up to 25 degrees centigrade, free from carbon disulfid, to the action of sodium.

3. A process for the manufacture of a substance resembling natural rubber, which consists in subjecting a fraction of the first runnings of a hydrocarbon of the benzol type taken up to 25 degrees centigrade, free from carbon disulfid, to the action of sodium in the presence of a small quantity of ammonia.

4. A process for the manufacture of a substance resembling natural rubber, which consists in subjecting a fraction of the first runnings of benzol taken up to 25 degrees centigrade, free from carbon disulfid, to the action of sodium, in the presence of a small quantity of ammonia.

In testimony whereof we affix our signatures in presence of two witnesses.

RUDOLF WEISSGERBER. [L. s.]
KONRAD KELLER. [L. s.]

Witnesses:
HELEN NUFER,
ALBERT NUFER.